United States Patent Office 3,364,231
Patented Jan. 16, 1968

3,364,231
PREPARATION OF 2-IMINO-1,3-DIHYDROGEN SULFATE
Stephen David Levy, Princeton, N.J., assignor to American Cyanamid Company, Stamford, Conn., a corporation of Maine
No Drawing. Filed Aug. 19, 1965, Ser. No. 481,108
12 Claims. (Cl. 260—327)

ABSTRACT OF THE DISCLOSURE

A process is provided for obtaining 2-imino-1,3-dithiolane dihydrogen sulfate by reacting a mixture of ethylene oxide, carbon disulfide and a catalytic amount of water with ammonia to form 2-hydroxyethyl dithiocarbamate, said ethylene oxide, carbon disulfide and ammonia being present in substantially equimolar amounts, cyclizing the thus-formed 2-hydroxyethyl dithiocarbamate with a sulfur-containing acid, such as at least 65% sulfuric acid, chlorosulfonic acid or fuming sulfuric acid and, finally, recovering so-formed 2-imino-1,3-dithiolane dihydrogen sulfate, a pesticide intermediate.

The present invention relates to a novel process for the preparation of a 2-imino-1,3-dithiolane salt. More particularly, the invention relates to a novel process for the preparation of 2-imino-1,3-dithiolane dihydrogen sulfate. Still more particularly, the invention is concerned with a novel catalytic procedure involving the initial preparation of 2-hydroxyethyl dithiocarbamate and, subsequently, effecting ring closure with a strong sulfur-containing acid.

The hydrohalide salts of the 2-imino-1,3-dithiolanes have been prepared and utilized in the manufacture of highly effective organophosphate pesticides. However, the procedures by which such materials have been produced have not been wholly satisfactory. Most previous processes have involved a plurality of reactions necessitating separation of desired intermediate and final products from by-products and solvent following each treatment step. Further, these have been limited to the preparation of the hydrohalide salt of iminodiethiolanes and the procedures have involved rather difficult purification treatments.

In one of the more recently developed processes for the preparation of 2-imino-1,3-dithiolane hydrochloride from ethane dithiol and cyanogen chloride, there is afforded good yields of product. Unfortunately, difficulties are presented due to the physical nature of the starting materials. The odor problem connected with ethane dithiol and the corrosive character and toxicity of cyanogen chloride do limit the use of the process.

It has now been discovered that many of the difficulties of the prior art practice can be avoided by adopting the process of the instant invention which can be graphically represented as follows:

Reaction I

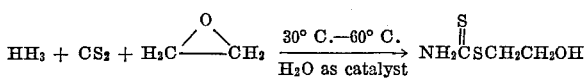

Reaction II

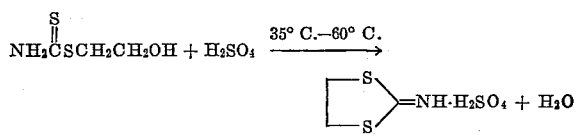

As represented above, the overall process is initially directed to the preparation of 2-hydroxyethyl dithiocarbamate, by the reaction of substantially equimolar amounts of ethylene oxide with carbon disulfide and ammonia in the presence of a catalytic amount of water. For optimum results, however, the reaction contemplates the inclusion of an inert solvent selected from the group consisting of lower alkyl carboxylic acid esters and lower aliphatic ketones, such as diethyl ketone, methyl ethyl ketone or methyl isobutyl ketone. Subsequently, resultant 2-hydroxyalkyl dithiocarbamate is treated with substantially an equimolar amount of a strong sulfur-containing acid, illustrative of which acid is concentrated sulfuric acid, fuming sulfuric acid or chlorosulfonic acid.

As stated above, Reaction I is conducted preferably in an inert lower alkyl ester solvent, such as ethyl acetate or butyl acetate, at a controlled temperature ranging between about 30° C. and 60° C., and, preferably between 40° C. and 50° C. In Reaction II above, the 2-hydroxyalkyl dithiocarbamate is treated with a strong sulfur containing acid conducted also preferably in an inert alkyl ester solvent for ease of operation. If desired, it may be conducted in the absence of a solvent. Reaction II, however, may be conducted at from 35° C. to 60° C. and, preferably, at from 40° C. to 50° C.

Resultant reaction mixture can then either be filtered to collect resultant iminodithiolane dihydrogen sulfate, or treated with water and the aqueous phase collected in good yield and purity. The latter treatment step is especially efficacious and desirable in that the aqueous solution containing 2-imino-1,3-dithiolane dihydrogen sulfate can be utilized in a phosphorylation reaction directly without further treatment.

In a preferred embodiment involving Reaction I above, a mixture of ethylene oxide, carbon disulfide, a catalytic amount of water and ethyl acetate is reacted with ammonia to form 2-hydroxyethyl dithiocarbamate. Both temperature control and the control of the molar ratio of ammonia to carbon disulfide to epoxide maintained at about 1:1:1 are critical so as to obtain an optimum yield of desired product. For instance, maximization of yields is achieved at a temperature between about 40° C. and 50° C. Reduction in yields to about 60–65% of theoretical is observed as the critical temperature limit is approached. For instance, below about 30° C. or above 60° C., yields of desired 2-hydroxyethyl dithiocarbamate rapidly decrease. Similarly, it has been observed that the choice of solvent is a significant factor in obtaining optimum yields. The use of solvents other than the preferred alkyl carboxylic acid esters, such as ethyl acetate, or aliphatic ketones, such as diethyl ketone, significantly reduces yield of product.

The catalytic effect of water in the Reaction I step of the invention has also been observed in a series of reactions in which temperature, hold time, and reactive ingredients were maintained constant, while the amount of water present in the reaction mixture was varied between zero pound and about two pounds per about 400 pounds of mixture. In general, from about 0.10% to about 0.50% of water is added to the mixture. For optimum yield and purity of product, there is added from 0.20% to 0.30% water. With the addition of more than 0.50% of water, both yield and purity of product are reduced. In the absence of water, the time for the reaction is substantially increased and the yield is markedly reduced.

As hereinabove noted, cyclization or ring closure of 2-hydroxyethyl dithiocarbamate in Reaction II above is carried out in the presence of a strong sulfur containing acid. For instance, when employing sulfuric acid, diluted to concentrations below about 65%, product yield is so reduced as to eliminate all process advantages. Concentrations in excess of 65% and, preferably, in excess of 80% sulfuric acid are required for optimum yields.

The invention may be better understood by referring to the illustrative examples set forth below. It is understood that these examples are not to be taken as limitative of the invention.

REACTION I.—PREPARATION OF 2-HYDROXYETHYL DITHIOCARBAMATE

Example 1

To a suitable pressure vessel are added 10.6 grams of ethylene oxide, 15.2 grams of carbon disulfide, 100 milliliters of ethyl acetate, and 1.0 gram of water and stirred in a bath maintained at 25° C.–30° C. while 3.8 grams of ammonia are added under a pressure of 25 p.s.i. over a period of one hour. The reaction is exothermic and the internal temperature thereof is maintained at between about 30° C. and about 40° C. Following the addition of the ammonia, the mixture is stirred for an additional two-hour period. The reaction is then complete. Removal of solvent in vacuo is effected. A 96.4% yield (27.3 grams) of a yellow oil which contains 96.8% of 2-hydroxyethyl dithiocarbamate is obtained.

Example 2

Repeating the procedure of Example 1 above in every detail except that the reaction is carried out with butyl acetate in lieu of ethyl acetate at 50° C.–60° C. and a maximum pressure maintained at 60 p.s.i. Ammonia addition required 40 minutes. Resultant product weighs 24.6 grams and contains 92.9% of the desired material in 83.4% yield.

Example 3

Example 1 is repeated in every detail except that methyl isobutyl ketone is employed as the inert ketonic solvent. There is obtained 26.8 grams of resultant product which is 89.4% pure. This amounts to a yield of 87.4%.

Example 4

To a suitable reaction pressure vessel are added 15.2 grams of carbon disulfide, 1 gram water, and 100 milliliters of ethylene oxide and heated to 35° C.–40° C. There is next added 3.5 grams of ammonia over a 25-minute period at a maximum pressure of 35 p.s.i. and a temperature of 40° C.–50° C. After stirring for an additional hour, 27.6 grams of product containing 75.5% 2-hydroxyethyl dithiocarbamate is obtained by distillation of the solvent in vacuo. The product amounts to a 76.3% yield.

Example 5

Ethylene oxide (0.24 mole), carbon disulfide (0.20 mole), 1 milliliter of water and 100 milliliters of acetone are admixed and heated to 35° C.–40° C. in a suitable pressure vessel. Ammonia (0.21 mole) is distilled into the vessel at 35° C.–40° C. bath temperature over a period of 20 minutes at a maximum pressure of 25 p.s.i. Stirring is continued for 40 minutes. There is recovered 27.9 grams of crude 2-hydroxyethyl dithiocarbamate containing 63.4% of the desired ester.

Example 6

Carbon disulfide (15.2 grams), ethylene oxide (10.6 grams), 100 milliliters of 1,2-dichloroethane, and 0.2 gram of water are heated to 55° C.–60° C. bath temperature. Ammonia (3.5 grams) is next distilled into the vessel over a period of 45 minutes at a maximum pressure of 60 p.s.i. and a temperature of 60° C.–70° C. After heating for one hour more, the product is obtained by the removal of the solvent in vacuo. There is obtained 26.2 grams of yellow oil which contains 47.7% of the desired 2-hydroxyethyl dithiocarbamate product, amounting to a 45.6% yield.

Example 7

Following the procedure set forth in Example 1 in every detail, four separate solutions comprising a mixture of 44 pounds of ethylene oxide, 76 pounds of carbon disulfide, 270 pounds of ethyl acetate, and 0, 0.5, 1.0 and 2.1 pounds of water separately provided are treated separately with 17.9 pounds of ammonia. The reaction temperature is maintained at 40° C. with the exception involving the mixture containing no water which then was required to be heated to 50° C. in order to cause the reaction to proceed. Results of the tests are reported in Table I below. The catalytic effects of the water in the reaction mixture are clearly demonstrated. In the absence of water the reaction proceeds very slowly. With excess water both purity and yield of resultant product are reduced.

TABLE I

| Pounds water | Temp., ° C. | Hours hold time | Percent yield | Percent purity |
|---|---|---|---|---|
| 1.0 | 40 | 1 hr., 40° C. | 90.9 | 93.8 |
| 0 | 40 | 1 hr., 40° C. | (¹) | (¹) |
| 0 | 40 | 3 hrs., 50° C. | 87.6 | 94.3 |
| 0.5 | 40 | 4 hrs., 40° C. | 90.0 | 90.4 |
| 2.1 | 40 | 1 hr., 40° C. | 89.1 | 89.2 |

¹ Incomplete.

Example 8

Repeating the procedure of Example 7 above in every detail except that separate solutions comprising 44 pounds of ethylene oxide, 76 pounds of carbon disulfide, 270 pounds of ethyl acetate, and one pound of water, are treated with 17.9 pounds of ammonia. The temperature at which the reactions are conducted is the sole variable. Reactions are carried out at 30° C., 40° C. and 60° C., respectively. From the data obtained in Table II below, it can be seen that temperature reaction is indeed critical. At 30° C., or below, the reaction proceeds very sluggishly and yield is decreased substantially. It is to be noted that optimum yields and purity are achieved at about 40° C. and at temperatures of 60° C., and above, overall yields and purity are decreased.

| Internal Temp., ° C. | Pounds Water | NH₃ Add Time, hr. | Hold Time, hr. | Percent Yield | Percent Purity |
|---|---|---|---|---|---|
| 30 | 1 | 3 | (¹) | (²) | (²) |
| 30 | 1 | 3 | 3 | 36.9 | 92.9 |
| 40 | 1 | 1 | 1 | 90.9 | 92.1 |
| 60 | 1 | 1 | 1 | 77.4 | 76.8 |

¹ Overnight.
² Incomplete.

REACTION II.—PREPARATION OF IMINODITHIOLANE DIHYDROGEN SULFATE

Example 9

During a one-hour period, 111.5 grams (1.1 mole) of 96.5% sulfuric acid (1.1 mole) is added to a solution of 137.2 grams (1.0 mole) of 2-hydroxyethyl dithiocarbamate in 300 milliliters of ethyl acetate. The mixture is maintained at 50° C. After stirring at 50° C. for a total of four hours, resultant product is isolated by filtration. The crude material is washed with acetone and dried at a reduced pressure of 100 mm. mercury to give 169 grams of a white solid which contains 95.4% 2-imino-1,3-dithiolane dihydrogen sulfate.

In essentially the same manner, an equimolar quantity of 30% fuming sulfuric acid is substituted above for the 96.5% sulfuric acid. 186 grams of a solid which analyzes as containing 93.9% of the desired material is obtained.

Example 10

121.7 grams (1.2 mole) of 96.5% sulfuric acid are added to a solution of 137.2 grams (1.0 mole) of 2-hydroxyethyl dithiocarbamate in 300 milliliters ethyl acetate while the temperature is maintained at 35° C. The addition requires about one hour. The mixture is then stirred at 35° C. for two additional hours and the desired product is obtained by filtration. After washing the filter cake with acetone, a 63.5% yield of 97.0% pure 2-imino-1,3-dithiolane dihydrogen sulfate is obtained.

Example 11

The procedure of Example 10 is repeated in every detail, except that the temperature is increased to 60° C. Heating is continued for five hours after the addition of the sulfuric acid has been completed. A 77.9% yield of solid containing 91.8% of the desired product is obtained.

Example 12

The procedure of Example 10 is repeated in every material respect except that a temperature of 50° C. is employed. After the acid has all been added, the mixture is heated for five hours. A 75.4% yield of 95.8% pure product is isolated.

Example 13

The procedure of Example 10 is repeated in every detail except that a temperature of from 5° C. to 10° C. is maintained during reaction. Stirring at the latter temperature for six hours affords a 34% yield of solid which contains 97.3% 2-imino-1,3-dithiolane dihydrogen sulfate.

Example 14

In this example there is added 0.55 mole of 90% $H_2SO_4$ to 0.5 mole of 2-hydroxyethyl dithiocarbamate in 150 milliliters of ethyl acetate over a period of one hour. The temperature is maintained at 50° C. After the addition is complete, the mixture is stirred for three hours at 50° C. Thereafter, the mixture is cooled. To the cooled mixture are added 65 milliliters of water and the aqueous phase is next collected. 192 grams of a solution containing 45.5% 2-imino-1,3-dithiolane dihydrogen sulfate (80.4% yield) is obtained.

Example 15

The reaction is carried out in every detail as in Example 14 above except that 80% $H_2SO_4$ is used. 202.4 grams of a solution containing 41.3% 2-imino-1,3-dithiolane dihydrogen sulfate (76.9% yield) are obtained.

Example 16

Example 14 is repeated except that 65% $H_2SO_4$ is employed and the reaction is carried out on a one mole scale. 393.3 grams of a solution containing 35.6% of the desired product (64.5% yield) are obtained.

Example 17

The reaction of Example 14 is repeated in every detail except that 50% sulfuric acid is employed. However, after the water is added, the reaction product is homogeneous. Addition of 100 milliliters water and 250 milliliters ethyl acetate produces two phases. 394.2 grams of a solution containing 22.0% 2-imino-1,3-dithiolane dihydrogen sulfate (40.0% yield) are obtained.

Example 18

The procedure of Example 17 is followed except that 30% $H_2SO_4$ is employed. 471.9 grams of a solution containing 10.6% product (23.0% yield) are obtained.

Example 19

1.1 mole of chlorosulfonic acid is added to 1.0 mole of 2-hydroxyethyl dithiocarbamate in 300 milliliters of ethyl acetate over a period of one hour while the reaction temperature is maintained at 50° C. When the addition is completed, the mixture is stirred for three hours at 50° C. It is cooled and the cooled slurry is filtered, washed with acetone, and dried in vacuo overnight. 184.8 grams of solid which contains product equivalent to 187 grams of 2-imino-1,3-dithiolane dihydrogen sulfate (86.2% yield) are obtained.

Example 20

Two moles of 2-hydroxyethyl dithiocarbamate (89.9% pure) is maintained at 20° C. and 1.2 moles of 96% sulfuric acid added over a period of one hour. The mixture is stirred four hours longer at 20° C. and treated with 300 milliliters of water at the end of the reaction period. The aqueous phase contains 354 grams of the desired product amounting to an 82% yield.

I claim:

1. A method of preparing a 2-imino-1,3-dithiolane dihydrogen sulfate comprising the steps of: reacting a mixture of ethylene oxide, carbon disulfide, and a catalytic amount of water with ammonia whereby 2-hydroxyethyl dithiocarbamate is formed, said ethylene oxide, carbon disulfide and ammonia being present in substantially equimolar amounts, thereafter cyclizing the thus-formed 2-hydroxyethyl dithiocarbamate with a sulfur-containing acid selected from the group consisting of fuming sulfuric acid, chlorosulfonic acid and at least 65% sulfuric acid, and recovering the thus-formed 2-imino-1,3-dithiolane dihydrogen sulfate in good yield and purity.

2. A method according to claim 1 wherein the reactions are conducted in the presence of an inert solvent selected from the group consisting of lower alkyl carboxylic acid esters and lower aliphatic ketones.

3. A method according to claim 2 wherein the ammonia, carbon disulfide and ethylene oxide are present in the reaction mixture in substantially equimolar amounts.

4. A method according to claim 3 wherein the ammonia is added to the reaction mixture at a rate sufficient to maintain the temperature of reaction between about 30° C. and about 60° C.

5. A method according to claim 4 wherein the acid is fuming sulfuric acid.

6. A method according to claim 4 wherein the acid is chlorosulfonic acid.

7. A method according to claim 4 wherein the acid is sulfuric acid having a concentration of at least about 65%.

8. A method of preparing a 2-imino-1,3-dithiolane dihydrogen sulfate comprising the steps of: reacting in the presence of an inert solvent at a temperature between about 30° C. and 60° C. a mixture of (a) equimolar amounts of ethylene oxide and carbon disulfide and (b) a catalytic amount of water with (c) a mole of ammonia whereby 2-hydroxyethyl dithiocarbamate is formed, thereafter cyclizing in the absence of solvent the thus-formed dithiocarbamate with a sulfur-containing acid in substantially equimolar amounts, said acid being selected from the group consisting of fuming sulfuric acid, chlorosulfonic acid and at least 65% sulfuric acid, and recovering the thus-formed 2-imino-1,3-dithiolane dihydrogen sulfate in good yield and purity.

9. A method of preparing 2-hydroxyethyl dithiocarbamate comprising the steps of: reacting substantially equimolar amounts of ethylene oxide and carbon disulfide with ammonia in the presence of a catalytic amount of water and a solvent selected from the group consisting of lower alkyl carboxylic acid esters and lower aliphatic ketones, maintaining the temperature of the mixture between about 30° C. and 60° C. during the reaction period, and recovering the 2-hydroxyethyl dithiocarbamate from said mixture.

10. A method according to claim 9 wherein the solvent is ethyl acetate.

11. A method according to claim 9 wherein the solvent is butyl acetate.

12. A method according to claim 9 wherein the solvent is methyl isobutyl ketone.

References Cited

UNITED STATES PATENTS 3,233,963  2/1966  Olin _____ 260—327

FOREIGN PATENTS 1,114,506  10/1961  Germany.

OTHER REFERENCES

Price et al.: Jour. Amer. Chem. Soc., vol. 75 (1953), page 2396.

JAMES A. PATTEN, *Primary Examiner.*